(12) United States Patent
Wang

(10) Patent No.: US 11,603,913 B2
(45) Date of Patent: Mar. 14, 2023

(54) LEAD SCREW DEVICE

(71) Applicant: SHINANO KENSHI CO., LTD., Ueda (JP)

(72) Inventor: Donghui Wang, Nagano (JP)

(73) Assignee: SHINANO KENSHI CO., LTD., Ueda (JP)

( * ) Notice: Subject to any disclaimer, the term of this patent is extended or adjusted under 35 U.S.C. 154(b) by 191 days.

(21) Appl. No.: 17/007,011

(22) Filed: Aug. 31, 2020

(65) Prior Publication Data

US 2021/0131538 A1 May 6, 2021

(30) Foreign Application Priority Data

Nov. 5, 2019 (JP) .............................. JP2019-200946

(51) Int. Cl.
*F16H 25/24* (2006.01)
*H02K 7/06* (2006.01)

(52) U.S. Cl.
CPC ............... *F16H 25/24* (2013.01); *H02K 7/06* (2013.01)

(58) Field of Classification Search
CPC ..... F16H 2025/2078; F16H 2025/2034; F16H 2025/2031; F16H 25/24; F16H 2025/2481; F16H 2025/2075; H02K 1/28; H02K 7/003
See application file for complete search history.

(56) References Cited

U.S. PATENT DOCUMENTS

| 5,099,161 A * | 3/1992 | Wolfbauer, III | ........ F16H 25/20 310/80 |
| 8,227,948 B1 * | 7/2012 | Fox | ........................ H02K 5/225 310/88 |
| 2003/0020337 A1 * | 1/2003 | Joachim | ................ H02K 7/1815 310/51 |
| 2007/0163306 A1 * | 7/2007 | Kim | ...................... H02K 1/2786 68/140 |
| 2013/0033137 A1 * | 2/2013 | Yu | .......................... H02K 7/085 310/90 |
| 2013/0187393 A1 * | 7/2013 | Numaguchi | ........... H02K 21/24 310/90 |
| 2015/0003906 A1 | 1/2015 | Johnson | |
| 2015/0252811 A1 * | 9/2015 | Tang | ...................... F04D 29/054 310/79 |
| 2015/0280501 A1 * | 10/2015 | Crum | ....................... H02K 1/28 310/216.121 |

FOREIGN PATENT DOCUMENTS

| JP | S62-258258 A | 11/1987 |
| JP | H09-57667 A * | 3/1997 |
| JP | H09-057667 A | 3/1997 |
| JP | 2000-107865 A | 4/2000 |
| JP | 2016154407 A * | 8/2016 |
| JP | 2018-014826 A | 1/2018 |

OTHER PUBLICATIONS

Aug. 17, 2021 Office Action issued in Japanese Patent Application No. 2019-200946.

* cited by examiner

*Primary Examiner* — William C Joyce
*Assistant Examiner* — Gregory Robert Weber
(74) *Attorney, Agent, or Firm* — Oliff PLC

(57) ABSTRACT

A lead screw device includes: a lead screw; and a motor that rotates the lead screw, wherein the motor includes: a hollow shaft fitted onto a part of an outer circumference of the lead screw; and a rotor core fitted onto a part of the outer circumference of the hollow shaft.

2 Claims, 3 Drawing Sheets

LEAD SCREW DEVICE

CROSS-REFERENCE TO RELATED APPLICATION

This application is based upon and claims the benefit of priority of the prior Japanese Patent Application No. 2019-200946, filed on Nov. 5, 2019, the entire contents of which are incorporated herein by reference.

BACKGROUND

(i) Technical Field

The present disclosure relates to a lead screw device.

(ii) Related Art

There is known a lead screw device equipped with a lead screw and a motor. For example, a rotor core of the motor may be directly fitted onto an outer circumference of the lead screw (see Japanese Unexamined Patent Application Publication No. 2018-014826).

SUMMARY

According to an aspect of the present disclosure, there is provided a lead screw device includes: a lead screw; and a motor that rotates the lead screw, wherein the motor includes: a hollow shaft fitted onto a part of an outer circumference of the lead screw; and a rotor core fitted onto a part of the outer circumference of the hollow shaft.

DETAILED DESCRIPTION

Figure 1:
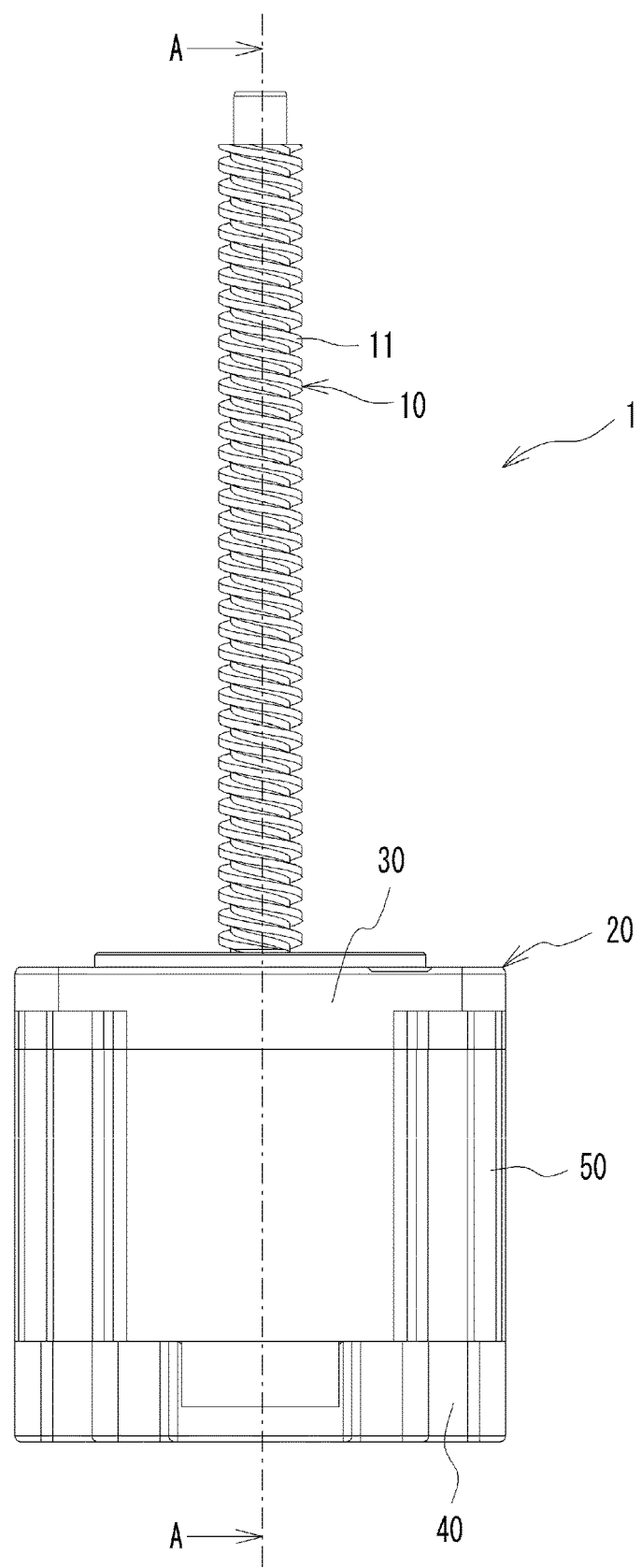
FIG. 1 is an external perspective view of a lead screw device.
Figure 2:
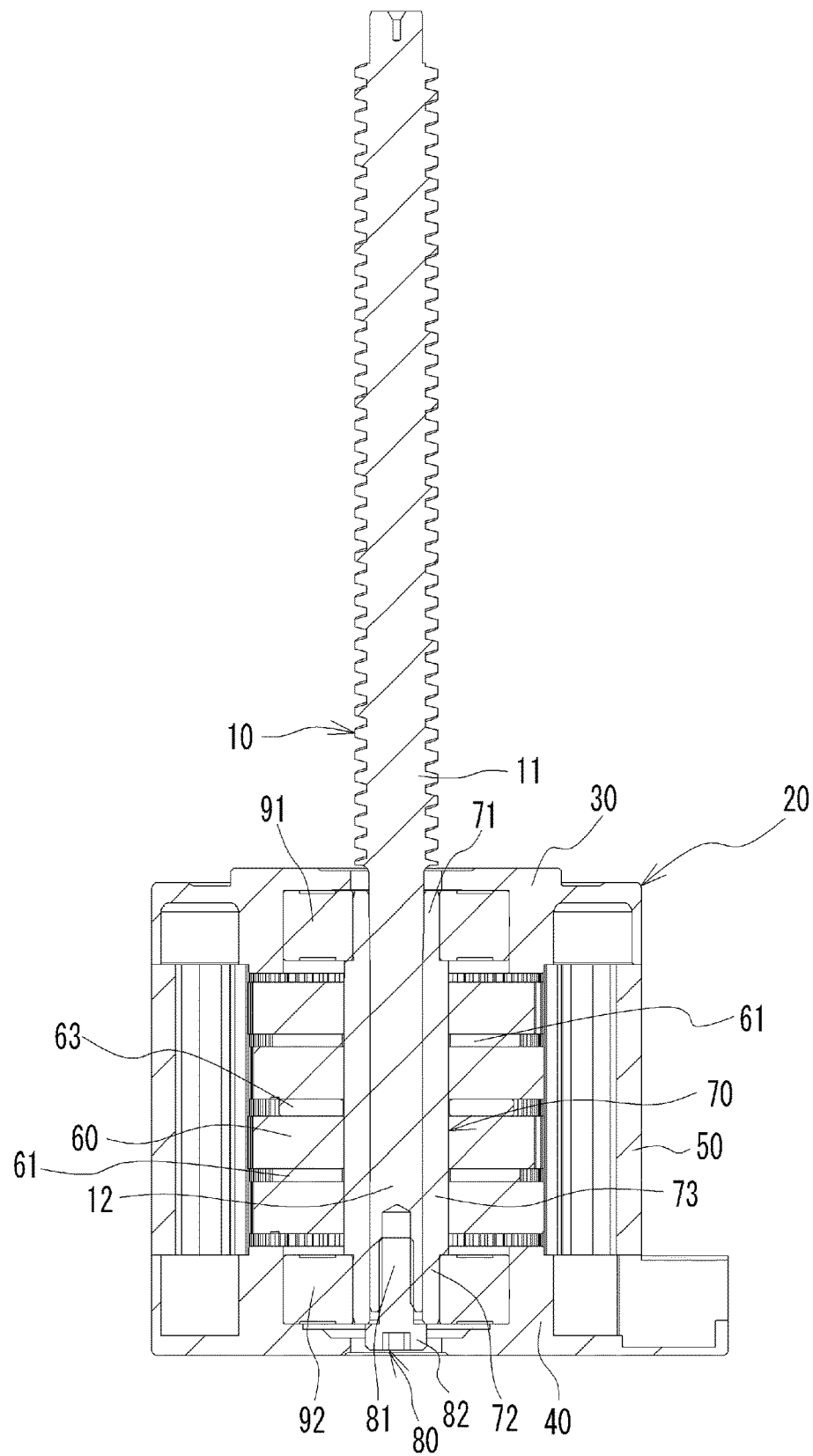
FIG. 2 is a cross-sectional view taken along line A-A of FIG. 1.
Figure 3:
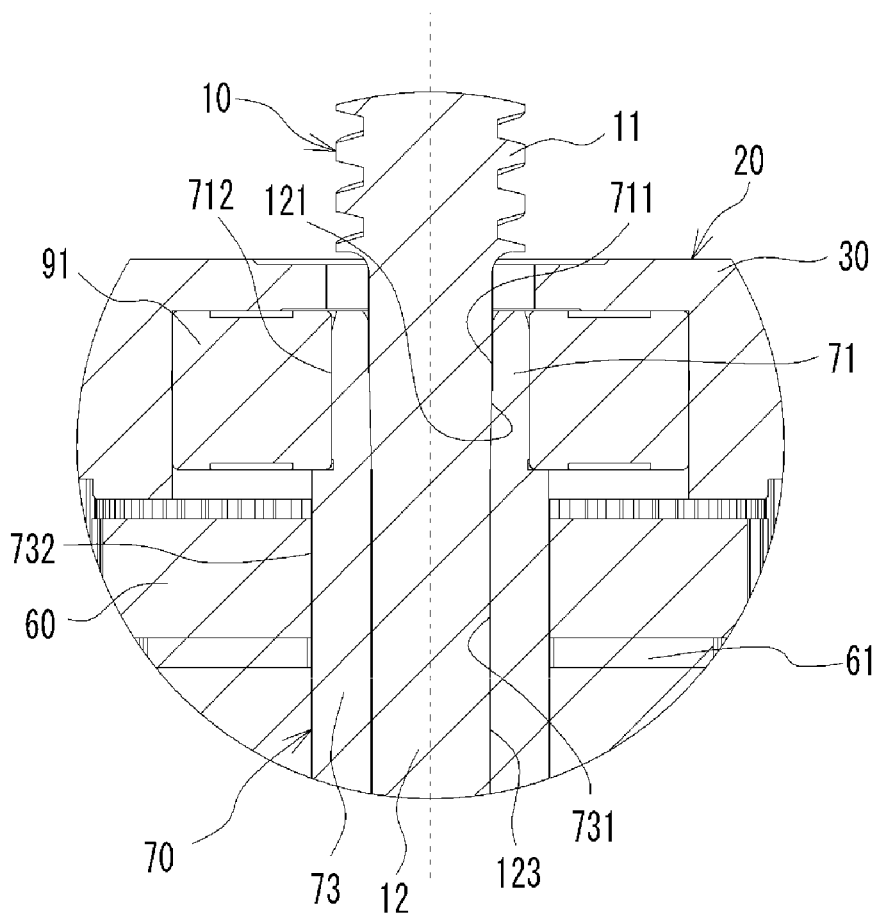
FIG. 3 is a partially enlarged view of FIG. 2.

FIG. 1 is an external perspective view of a lead screw device 1. The lead screw device 1 is equipped with a lead screw 10 and a motor 20 that rotates the lead screw 10. FIG. 2 is a cross-sectional view taken along line A-A of FIG. 1. FIG. 3 is a partially enlarged view of FIG. 2. The lead screw 10 includes a shaft portion 12 rotatably held by the motor 20, and a male threaded portion 11 protruding from the motor 20 and having a groove formed in the outer circumferential surface. A groove, such as the male threaded portion 11, is not formed on the outer circumferential surface of the shaft portion 12. The lead screw 10 is made of, but not limited to, metal. The motor 20 is a stepping motor.

As illustrated in FIG. 2, the motor 20 includes brackets 30 and 40, a stator 50, rotor cores 60, magnets 61, a spacer 63, a hollow shaft 70, and an adjustment screw 80. The brackets 30 and 40, each having a substantially disc shape, are fixed to the stator 50 so as to sandwich the stator 50. The stator 50 has a substantially cylindrical shape. The bracket 40 is disposed in a proximal end side of the lead screw 10. The bracket 30 is disposed in a distal end side of the lead screw 10 with respect to the bracket 40. The brackets 30 and 40 are made of, but not limited to, metal. The stator 50 is made of metal.

The four rotor cores 60, the two magnets 61, the spacer 63, and the hollow shaft 70 are provided within the stator 50. The hollow shaft 70 is partially fitted onto the outer circumference of the shaft portion 12 of the lead screw 10. The hollow shaft 70 is made of, but not limited to, metal. The hollow shaft 70 includes a small-diameter portion 71 formed in the distal end side, a small-diameter portion 72 formed in the proximal end side, and a large-diameter portion 73 formed between the small-diameter portions 71 and 72. Each outer diameter of the small-diameter portions 71 and 72 is smaller than the outer diameter of the large-diameter portion 73. Herein, the brackets 30 and 40 hold bearings 91 and 92 for supporting the hollow shaft 70 for rotation, respectively. As illustrated in FIG. 3, an inner ring of the bearing 91 is fitted onto an outer surface 712 of the small-diameter portion 71 of the hollow shaft 70. Likewise, as illustrated in FIG. 2, an inner ring of the bearing 92 is fitted onto an outer surface of the small-diameter portion 72 of the hollow shaft 70.

The four rotor cores 60 aligned in an axial direction are fitted onto an outer surface 732 of the large-diameter portion 73 of the hollow shaft 70. The number of the rotor cores 60 is not limited to four, and may also be one. The magnet 61 is disposed between the first rotor core 60 adjacent to the bracket 30 and the second rotor core 60 adjacent to the first rotor core 60. Further, the other magnet 61 is disposed between the third rotor core 60 adjacent to the bracket 40 and the fourth rotor core 60 adjacent to the third rotor core 60. The spacer 63 is disposed between the two rotor cores 60 disposed in the center side among the four rotor cores 60. The magnet 61 having a thin disc shape is magnetized to have different polarities alternately arranged in a circumferential direction. The spacer 63 having a thin disc shape is made of aluminum or synthetic resin. The adjustment screw 80 is fixed by screwing into a threaded hole formed in the distal end of the shaft portion 12 of the lead screw 10. The adjustment screw 80 will be described later in detail. As described above, the lead screw 10, the rotor cores 60, the magnets 61, the spacer 63, the hollow shaft 70, and the adjustment screw 80 rotate together relative to the brackets 30 and 40 and the stator 50.

A plurality of coils not illustrated are wound around the stator 50. The stator 50 is excited in accordance with an energized state of these coils. This causes the lead screw 10, the four rotor cores 60, the two magnets 61, the spacer 63, the hollow shaft 70, and the adjustment screw 80 to rotate together in accordance with the magnetic attractive force and the magnetic repulsive force acting between the stator 50 and the magnets 61.

As described above, the rotor cores 60 are fitted onto the outer surface 732 of the hollow shaft 70, but not directly fitted onto the lead screw 10. Thus, for example, when another lead screw different from the lead screw 10 in the outer diameter is employed, a hollow shaft different from the hollow shaft 70 and having an inner diameter corresponding to the outer diameter of the other lead screw has only to be prepared. Thus, the rotor cores 60 themself are diverted. Herein, the rotor cores 60 are designed and manufactured, in consideration of the rotational driving force which the magnetic force and the magnetic flux acting between the rotor cores 60 and the stator 50 influence on. For this reason, the cost of the rotor core 60 is high. Since such costly rotor cores 60 are diverted, it is possible to easily replace the lead screw with another lead screw having a different size of an outer diameter at a low cost.

Inner rings of the bearings 91 and 92 are also fitted onto the hollow shaft 70, but not directly fitted onto the lead screw 10. Also in this case, another hollow shaft different from the hollow shaft 70 in inner diameter is prepared, so that the bearings 91 and 92 are diverted, and a lead screw having a different outer diameter is employed.

Next, the adjustment screw 80 will be described. As illustrated in FIG. 2, the adjustment screw 80 includes a male threaded portion 81 screwed into the threaded hole of the shaft portion 12 of the lead screw 10, and a head portion 82 having an outer diameter larger than the outer diameter of the male threaded portion 81. The outer diameter of the head portion 82 is larger than the inner diameter of the small-diameter portion 72 of the hollow shaft 70. The head portion 82 is in contact with a proximal end surface of the small-diameter portion 72. As the amount of screwing between the adjustment screw 80 and the lead screw 10 increases, the force acts on the lead screw 10 so as to move the lead screw 10 toward the proximal end, that is, downwardly on the sheet of FIG. 2, with respect to the hollow shaft 70.

As illustrated in FIG. 3, a tapered surface 711, corresponding to the inner surface of the small-diameter portion 71, is formed such that the outer diameter decreases from the distal end to the proximal end. Correspondingly, the shaft portion 12 of the lead screw 10 is formed with a tapered surface 121 that is in contact with the tapered surface 711. As described above, as the amount of screwing between the adjustment screw 80 and the lead screw 10 increases, the force acts on the lead screw 10 toward the distal end with respect to the hollow shaft 70. This causes the tapered surface 121 to move toward the distal end with respect to the tapered surface 711, so that the tapered surface 121 and the tapered surface 711 are brought into close contact with each other. In the above way, the hollow shaft 70 and the lead screw 10 are fastened with a simple structure, and the increase in cost is suppressed. Additionally, when the lead screw 10 is replaced, the lead screw 10 is easily removed by removing the adjustment screw 80 from the lead screw 10. This improves the disassembly workability. Further, the tapered surfaces 121 and 711 are in contact with each other. It is thus possible to suppress the positional displacement of the central axis of the hollow shaft 70 and the central axis of the lead screw 10, and to position the hollow shaft 70 and the lead screw 10. This improves the positional accuracy of the hollow shaft 70 and the lead screw 10 in the radial direction.

Herein, if each taper angle of the tapered surfaces 711 and 121 is too large, the fastening force between the lead screw 10 and the hollow shaft 70 is reduced. If each taper angle is too small, the positional accuracy of the lead screw 10 in the axial direction is degraded due to part tolerance. Thus, in the present embodiment, the taper angle is about 2 degrees to 4 degrees, which ensures both the fastening force and the positional accuracy in the axial direction of the lead screw 10.

The bearing 91 fitted onto the small-diameter portion 71 is provided radially outward from the tapered surfaces 711 and 121. As a result, the bearing 91 holds a part where the lead screw 10 and the hollow shaft 70 are in close contact with each other from outside, thus improving the fastening of the lead screw 10 and the hollow shaft 70.

Regardless of a position in the axial direction, an inner diameter of an inner surface 731 of the large-diameter portion 73 is constant, and an outer diameter of an outer surface 123 of the shaft portion 12 is constant. A small gap is defined between the inner surface 731 of the large-diameter portion 73 and the outer surface 123 of the shaft portion 12 in noncontact with each other. At the position where the male threaded portion 81 of the adjustment screw 80 is screwed, each of the outer diameter of the shaft portion 12 and the inner diameter of the small-diameter portion 72 is constant regardless of the position in the axial direction, and the shaft portion 12 and the small-diameter portion 72 are in contact with each other. That is, the hollow shaft 70 is fastened to the lead screw 10 at the small-diameter portions 71 and 72. The bearings 91 and 92 hold the small-diameter portions 71 and 72 for rotation, respectively.

While the exemplary embodiments of the present invention have been illustrated in detail, the present invention is not limited to the above-mentioned embodiments, and other embodiments, variations and variations may be made without departing from the scope of the present invention.

What is claimed is:

1. A lead screw device comprising:
    a lead screw;
    a motor that rotates the lead screw, the motor including:
        a hollow shaft fitted onto a part of an outer circumference of the lead screw, an inner circumference of a distal end of the hollow shaft including a first tapered surface, the first tapered surface having an inner diameter that gradually decreases from the distal end of the hollow shaft toward a proximal end of the hollow shaft, and
        a rotor core fitted onto a part of an outer circumference of the hollow shaft; and
    an adjustment screw which is screwed to a proximal end of the lead screw, a head portion of the adjustment screw being in contact with the proximal end of the hollow shaft, and a position of the lead screw relative to the hollow shaft in an axial direction of the lead screw being configured to be adjusted by an amount of screwing of the adjustment screw to the lead screw,
    wherein:
        the lead screw includes a second tapered surface fitted to the first tapered surface, an outer diameter of the second tapered surface gradually decreasing from a distal end of the lead screw toward the proximal end of the lead screw,
        the first and second tapered surfaces are positioned at a distal end side of the lead screw, the distal end side being distal relative to the rotor core, and
        a distal end of the adjustment screw is spaced away from the first and second tapered surfaces toward the proximal end of the lead screw.

2. The lead screw device according to claim 1, wherein the motor includes a bearing fitted onto the outer circumference of the hollow shaft at the distal end of the hollow shaft, and
    the first and second tapered surfaces are positioned radially inward from the bearing.

* * * * *